(12) United States Patent
Mercier et al.

(10) Patent No.: US 8,760,344 B2
(45) Date of Patent: Jun. 24, 2014

(54) PROCESSING OF RADIONAVIGATION SIGNALS USING A WIDE-LANE COMBINATION

(75) Inventors: Flavien Mercier, Auzeville (FR); Denis Laurichesse, Tournefeuille (FR)

(73) Assignee: Centre National d'Etudes Spatiales (FR)

(*) Notice: Subject to any disclaimer, the term of this patent is extended or adjusted under 35 U.S.C. 154(b) by 616 days.

(21) Appl. No.: 13/119,638

(22) PCT Filed: Sep. 21, 2009

(86) PCT No.: PCT/EP2009/062217
§ 371 (c)(1),
(2), (4) Date: May 5, 2011

(87) PCT Pub. No.: WO2010/034694
PCT Pub. Date: Apr. 1, 2010

(65) Prior Publication Data
US 2011/0210888 A1      Sep. 1, 2011

(30) Foreign Application Priority Data
Sep. 23, 2008   (FR) ...................................... 08 56378

(51) Int. Cl.
*G01S 19/44*   (2010.01)
*G01S 19/25*   (2010.01)

(52) U.S. Cl.
CPC . *G01S 19/44* (2013.01); *G01S 19/25* (2013.01)
USPC .................................. 342/357.44; 342/357.64

(58) Field of Classification Search
CPC .......... G01S 19/44; G01S 19/43; G01S 19/25
USPC ............................ 342/357.26, 357.27, 357.64
See application file for complete search history.

(56) References Cited

U.S. PATENT DOCUMENTS

| | | | |
|---|---|---|---|
| 7,117,417 B2* | 10/2006 | Sharpe et al. | 714/746 |
| 2008/0122688 A1* | 5/2008 | Hatch | 342/357.06 |

FOREIGN PATENT DOCUMENTS

| | | |
|---|---|---|
| EP | 1724605 A1 | 11/2006 |
| JP | 2005069866 A | 3/2005 |
| JP | 2007101484 A | 4/2007 |

OTHER PUBLICATIONS

Wubbena et al, "PPP-RTK: Precise Point Positioning Using State-Space Representation in RTK Networks," 18th International Meeting ION GNSS-05, Sep. 2005.*

(Continued)

*Primary Examiner* — Gregory C Issing
(74) *Attorney, Agent, or Firm* — Cantor Colburn LLP (57) ABSTRACT

A method for processing radionavigation signals coming from satellites that broadcast the radionavigation signals on at least two distinct frequencies, comprises
 receiving the signals for each satellite,
 realizing, for each satellite, non-differentiated measurements of code and phase (10),
 determining the widelane ambiguities in a coherent manner on the group of satellites (12, 13, 14) by using the widelane biases associated with the satellites, received from a reference system, and
 global positioning of the receiver with the help of measurements of code and phase and the coherent widelane ambiguities (16, 18).
The global positioning comprises, for each satellite, the determination (16) of a pseudo distance by means of an ionosphere-free combination of the measurements of code and of the difference of the phase measurements, compensated for the widelane ambiguity, this ionosphere-free combination being optimized in terms of noise. The pseudo distance is determined by receiving the satellite clock values associated with the ionosphere-free combination from the reference system.

18 Claims, 1 Drawing Sheet

(56) References Cited

OTHER PUBLICATIONS

Ge et al, "Resolution of GPS Carrier-Phase Ambiguities in Precise Point Positioning (PPP) with Daily Observations," Journal of Geod. Published online Oct. 23, 2007.*

Leandro, R.I et al, "Wide Area Based Precise Point Positioning," 19th International Technical Meeting of the Satellite Division, ION GNSS, Sep. 2006.*

Rho et al, "Dual Frequency GPS Precise Point Positioning with WADGPS Corrections," 18th International Technical Meeting of ION GNSS, Sep. 2005.*

Gao, Y. et al, "High Precision Kinematic Positioning Using Single Dual Frequency GPS Receiver," The Internatinal Archives of the Photogrammetry, Remote Sensing and Spatial Information Sciences, vol. 34, Part XXX, 2004.*

Japanese Office Action for corresponding application JPA2011-527349; Mail date Apr. 30, 2013.

Yun Zhang, "The benefit from triple frequencies in ambiguity resolution" collection of papers of Japan Institute of Navigation, Mar. 25, 2005, vol. 112, p. 219-227.

Robert S. Radovanovic, et al., " Using Optimal GNSS Multi-Frequency Carrier Phase Combinations for Precise Kinematic Positioning", ION 58th Annual Meeting/CIGTF 21st Guidance Test Symposium, Jun. 24-26, 2002, Albuquerque, NM, XP-002553918.

X. Shen, "Ambiguity Pseudo-fixing in Precise Single Point Positioning" ION 58th Annual Meeting/CIGTF 21st Guidance Test Symposium, Jun. 24-26, 2002, Albuquerque, NM, XP-002553917.

Simon Banville, "Satellite and receiver Base Bias Calibration for Undifferenced Ambiguity Resolution", ION NTM 2008, Jan. 28-30, 2008, San Diego, CA, XP-002532443.

D. Laurichesse, "Integer ambiguity resolution on undifferenced GPS phase measurements and its application to PPP", ION GSSS 20th International Technical Meeting of the Satellite Division, Sep. 25-28, 2007, Fort worth, TX XP-002553916.

D. Laurichesse, "Real Time Zero-Difference Ambiguity Fixing and Absolute RTK", ION NTM 2008, Jan. 28-30, 2008, San Diego, CA, XP-002532442.

International Search Report PCT/EP2009/062217; Dated Nov. 19, 2009.

\* cited by examiner

PROCESSING OF RADIONAVIGATION SIGNALS USING A WIDE-LANE COMBINATION

TECHNICAL FIELD

The present invention relates to the field of radionavigation systems or positioning by satellite, in particular a method of processing radionavigation signals transmitted by the satellites of such a system.

BACKGROUND

The satellite positioning systems such as GPS (Global Positioning System), Galileo, GLONASS, QZSS, Compass, IRNSS and others use modulated radionavigation signals called "spread spectrum modulation". These signals essentially carry pseudo random codes formed from periodically repeating numerical sequences, whose principal function is to allow Code Division Multiple Access (CDMA) and to supply a measurement of the signal propagation time transmitted by the satellite. Incidentally, the radionavigation signals can also carry a payload.

The radionavigation signals are formed by modulation of the central (carrier) frequencies. In the case of GPS, the radionavigation signals are transmitted in the frequency bands L1, centred on 1575.42 MHz and L2, centred on 1227.6 MHz. The band L5, centred on 1176.45 MHz, will be added when the GPS is updated. The satellites of the Galileo constellation will transmit in the bands E2-L1-E1 (the portion of the middle band L1 being the same as that of GPS), E5a (which, pursuant to the Galileo nomenclature, represents the band L5 destined for GPS), E5b (centred on 1207.14 MHz) and E6 (centred on 1278.75 MHz).

The basic measurements that can be carried out by a receiver include code measurements and carrier phase measurements. These basic measurements can, of course, be combined with each other. The code measurements are typically accurate to 1 meter whereas the phase measurements are accurate to some mm. However, phase measurements have the disadvantage that they provide only the fractional part of the phase difference of the carrier between the transmission by the satellite and the receiver. Consequently, the phase measurements are ambiguous in that the number of complete cycles between the satellite and the receiver is initially unknown. In order to be able to profit from the precision of the phase measurements, a receiver must resolve the ambiguities inherent in these phase measurements.

The phase ambiguities are usually resolved by differentiation of the phase measurements (simple or double differentiation) between satellites and/or receivers. This differentiation technique enables the (non modelled) causes of errors, which are common to a plurality of measurements, to be eliminated, and thereby reveals a complete information, which when taken into account, further improves the performance. However, this complete information consists of the differences from one or a plurality of basic ambiguities of phase, and in general does not enable the basic ambiguities of phase to be traced.

BRIEF SUMMARY

The invention proposes a method for processing radionavigation signals which, with the help of a GNSS receiver ("Global Navigation Satellite System"—abbreviation used here to describe a satellite navigation system that provides a global coverage for geopositioning) can increase the precision of the positioning solution.

In the following, one assumes a group of satellites (for example the satellites of a constellation of radionavigation satellites which are "visible" from the geographic location of the receiver or a part of them), whose satellites each transmit at least two radionavigation signals in two distinct frequency bands. Thus, each satellite broadcasts at least one first radionavigation signal on a first frequency and one second radionavigation signal on a second frequency that is distinct from the first. The receiver that has to fix its geographical position receives the first and second signals for each satellite of the group under consideration and executes, also for each satellite of the group, non-differentiated measurements of code and phase for these signals. It should be noted here that the term, "non-differentiated measurement" is used in this context to describe a basic measurement that is neither differentiated between satellites nor between receivers. It is well known that the phase measurements each have an integer ambiguity that is a priori unknown. Thus, for each satellite, the "widelane" combination of the phase measurements of the first and second signals also has an integer ambiguity that is a priori unknown. This ambiguity can be expressed in frequency cycles of the difference of the first and second frequencies and hereinafter is called the first widelane ambiguity (so as to distinguish it from one or a plurality of other possible widelane ambiguities that occur when there are more than two frequency bands, in which the satellites transmit radionavigation signals). It should also be noted that for each satellite of the group under consideration, there is a first widelane ambiguity that is associated with this satellite.

According to the invention, the method of processing the radionavigation signals further comprises the step of determination of the first widelane ambiguities in a coherent manner for the group of satellites. In this step the receiver that has to fix its position uses the widelane biases received from a reference system that is associated with the satellites of the group of satellites. The method also comprises the following step of fixing the position of the receiver with the help of measurements of code and phase of the first and second received signals as well as from the set of first widelane ambiguities determined in a coherent manner. The action of fixing the position of the receiver comprises, for each satellite of the group, the determination of a pseudo distance by means of an ionosphere-free combination, optimised in terms of noise, of measurements of code and of the difference of the measurements of phase of the first and second signals, compensated by the widelane ambiguity. In addition, the determination of the pseudo distance depends on the satellite clock values that were received from a reference system, associated with the ionosphere-free combination. The ionosphere-free combination is predetermined in the sense that the coefficients of the different terms of the combination are known from the side of the reference system—knowing the coefficients is required at the level of the reference system such that the reference system can transmit to the receiver the satellite clock values associated with the optimal combination, at the required rate. The coefficients of the optimised combination can be agreed upon in advance between the receiver and the reference system or can be fixed once and for all for the group of satellites. The numerical values of these coefficients are preferably chosen as a function of the characteristics of the radionavigation signal noise.

One can appreciate that the method according to the invention allows one to overcome complex network solutions for identifying a part of the basic ambiguities. By knowing the set of coherent integer widelane ambiguities makes available, at the level of the receiver, a new, unambiguous observable (i.e. the difference between the measurements of phase, compensated by the widelane ambiguity) in addition to the two measurements of code on each frequency. An analysis of the combinations of these three observables shows that it is possible to construct a combination giving a pseudo distance that is corrected for the ionospheric effects (therefore "ionosphere-free") with less noise than the combinations using solely the measurements of code. Moreover, this combination is less sensitive to multi-paths because it is based on measurements of phase.

The method can be generalised to systems with more frequencies, for example in the case of Galileo. For a tri-frequency system, two widelane combinations can be blocked, thereby affording five independent observables (i.e. two widelane combinations and three code measurements) having quite different noise characteristics and ionospheric contributions. In the tri-frequency case, each satellite of the group under consideration broadcasts a third radionavigation signal on a third frequency distinct from the first and second frequencies. Consequently, the method optionally comprises, at the level of the receiver and for each satellite of the group, the reception of the third signal as well as the means to carry out non-differentiated measurements of code and phase of the third received signal. As the measurement of phase of the third signal also has an a priori unknown integer ambiguity, the widelane combination of the measurements of phase of the first and third signals have an a priori unknown second widelane integer ambiguity. (NB. The widelane combination of the measurement of phase of the second and third signals also has an a priori unknown widelane integer ambiguity but this case does not warrant a separate discussion because it suffices to invert the designations of the first and second signals. The receiver then determines a set of second coherent widelane ambiguities for the group of satellites such that the action of fixing the position of the receiver is also based on measurements of code and phase of the third signals as well as the second widelane ambiguities determined in a coherent manner for the group of satellites.

As indicated above, the determination of the first and/or second widelane ambiguities in a coherent manner on the group of satellites comprises the reception of the widelane biases associated with the satellites by a reference system (e.g. a network of geographically fixed reference receivers).

Advantageously, the receiver calculates an estimated value for the first widelane ambiguity for each satellite of the group of satellites according to the equation:

$$\hat{N}_W = \left(\frac{P_2 - 2\gamma \hat{e}}{\lambda_2} - L_2\right) - \left(\frac{P_1 - 2\hat{e}}{\lambda_1} - L_1\right)$$

wherein $\hat{N}_W$ designates this estimated value of the first widelane ambiguity, $P_1$ and $P_2$ designate the measurements of code of the first and second signals, respectively, $L_1$ and $L_2$ designate the measurements of phase of the first and second signals, respectively, $\lambda_1$ and $\lambda_2$ designate the wavelengths of the first and second signals, respectively, $$\gamma = \frac{\lambda_2^2}{\lambda_1^2},$$

and $\hat{e}$ designates an estimate of the ionospheric delay for the first signal (expressed by $$\hat{e} = \frac{P_2 - P_1}{\gamma - 1}\bigg);$$

For each satellite, the receiver preferably uses a model of the first widelane ambiguity, given by the expression:

$N_W = \hat{N}_W - d + \mu_{sat} - \mu_{rec}$ wherein $N_W$ designates the first widelane ambiguity, d designates a geometric correction term, $\mu_{sat}$ designates the widelane bias associated with the respective satellite, transmitted to the receiver by the reference system, and $\mu_{rec}$ designates the widelane bias associated with the receiver, common to all the first widelane ambiguities.

The receiver then identifies a set of integer values of the first widelane ambiguities that conform to this model for the group of satellites. This identification of the integer values can be carried out in particular with the help of simple differences between satellites of the models of the first widelane ambiguities or by simultaneously solving the integer values and the term $\mu_{rec}$ with an evolution law adapted in time.

The optional determination of the second widelane ambiguities in a coherent manner for the group of satellites is preferably carried out in an analogous manner to the determination of the first widelane ambiguities.

The first, second and when applicable: third frequencies are preferentially selected among the frequencies L1, L2, L5 and E6.

Advantageously, among the non-differentiated measurements of code, at least one has a noise less than 0.5 m, preferably less than 0.25 m. In the case where each of the non-differentiated measurements of code has a noise greater than 0.5 m, the position is preferably fixed with the help of at least three frequencies (so that there are at least two observables of widelane phase).

One aspect of the invention relates to a GNSS receiver comprising the means to implement the method. Such means advantageously comprise a programme saved in a permanent or non-permanent memory of the receiver and configured such that it operates the receiver according to the described method when it is executed in the receiver.

BRIEF DESCRIPTION OF THE DRAWINGS

Other distinguishing features and characteristics of the invention will emerge from the detailed description of an advantageous illustrative embodiment presented below, on referring to the appended drawing.

DETAILED DESCRIPTION

For each satellite that is visible from the receiver, i.e. for each satellite above the horizon at the geographic location of the receiver, then at the level of the receiver (at step 10 of FIG. 1) there are at least two measurements of code (non-ambiguous), denoted $P_1$ and $P_2$, and at least two measurements of phase (ambiguous), denoted $L_1$ and $L_2$, for the frequencies $f_1$ and $f_2$, respectively.

Figure 1:
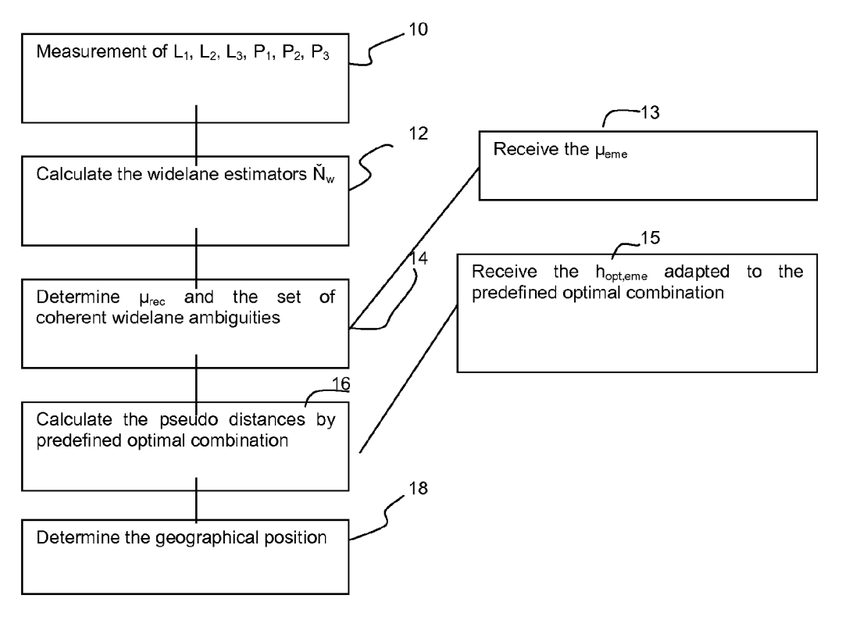
FIG. 1 shows a flow chart of a preferred embodiment of the method according to the invention.

The following notations will also be used:

$$\gamma = \frac{f_1^2}{f_2^2} = \frac{\lambda_2^2}{\lambda_1^2},$$

$$\lambda_1 = \frac{c}{f_1},$$

$$\lambda_2 = \frac{c}{f_2}$$

where c represents the speed of light. For the bands L1 and L2 of the GPS system, then for example $f_1=154\, f_0$ and $f_2=120\, f_0$ where $f_0=10.23$ MHz. The convention will be used, in which the code measurements $P_1$, $P_2$ are expressed in units of length, whereas the phase measurements $L_1$, $L_2$ are expressed in cycles.

The equation for the model of the measurements of code and phase (without phase jumps, measurements to the left, models to the right) are the following:

$$\lambda_1 L_1 = (D_1 + \lambda_1 W) - e - \lambda_1 N_1 + (\Delta h + \Delta\tau_1)$$

$$\lambda_2 L_2 = (D_2 + \lambda_2 W) - \gamma e - \lambda_2 N_2 + (\Delta h + \Delta\tau_{12} + \Delta\tau_2)$$

$$P_1 = D_1 + e + (\Delta h)$$

$$P_2 = D_2 + \gamma e + (\Delta h + \Delta\tau_{12}), \qquad (1)$$

wherein $D_1$ and $D_2$ represent the propagation distances between the phase centres, without ionospheric effects;

W is the phase rotation as a function of the propagation direction with respect to the dipole of the antenna ("windup" effect);

e is the ionospheric delay at the frequency $f_1$;

$\Delta h = h_{rec} - h_{eme}$, represents the difference between the clock of the receiver $h_{rec}$ and that of the transmitter $h_{eme}$ at each date;

$\Delta\tau_{12}$ is the difference of the inter-code bias between receiver and transmitter at each date;

$\Delta\tau_1$, $\Delta\tau_2$ is the code-phase bias (differences between the receiver and transmitter at each date) for $f_1$ and $f_2$, respectively; and $N_1$, $N_2$ are the integer ambiguities of phase of the two carriers, initially unknown and assumed to be invariant during a given passage of the satellite under consideration (i.e. the phase jumps that occur during a passage of the satellite are accounted for in the measurements of phase $L_1$ and $L_2$).

We remark that the biases $\Delta\tau_{12}$, $\Delta\tau_1$, $\Delta\tau_2$ can vary over time.

It should be noted here that in the case of a tri-frequency reception, then in addition, for each satellite, there are the measurement of code $P_3$ and the measurement of phase $L_3$ at the third frequency $f_3$ as well as the following equations from the model:

$$\lambda_3 L_3 = (D_3 + \lambda_3 W) - \gamma' e - \lambda_3 N_3 + (\Delta h + \Delta\tau_{13} + \Delta\tau_3)$$

$$P_3 = D_3 + \gamma' e + (\Delta h + \Delta\tau_{13})$$

wherein $$\gamma' \frac{f_1^2}{f_3^2} = \frac{\lambda_3^2}{\lambda_1^2},$$

$$\lambda_3 = \frac{c}{f_3},$$

$N_3$ represents the integer ambiguity of phase of the third carrier, initially unknown and assumed to be invariant during a given passage of the satellite under consideration;

$D_3$ represents the propagation distance between the phase centres, without ionospheric effects; and $\Delta\tau_{13}$ is the difference of the inter-code biases between receiver and transmitter at each date for the frequencies $f_1$ and $f_3$;

$\Delta\tau_3$ is the code-phase bias for $f_3$.

As the equations for the frequency pair $(f_1, f_3)$ are obtained directly from the equations for the pair $(f_1, f_2)$ by exchanging the index "2" by the index "3", the following discussion will only treat the frequency pair $(f_1, f_2)$ in order to avoid unnecessary repetition.

The widelane ambiguity (integer) is defined by $N_W = N_2 - N_1$. The widelane estimator for $N_W$ (step 12) can be constructed by the following equations:

$$\hat{e} = \frac{P_2 - P_1}{\gamma - 1}$$

(estimation of the ionospheric delay, without system biases)

$$\hat{N}_1 = \frac{P_1 - 2\hat{e}}{\lambda_1} - L_1$$

$$\text{and } \hat{N}_2 = \frac{P_2 - 2\gamma\hat{e}}{\lambda_2} - L_2$$

(estimation of the ambiguities)

$\hat{N}_W = \hat{N}_1 - \hat{N}_2$ (estimation of the widelane ambiguity)

The measurement equations for this estimator can be constructed starting from the equations (1), thus affording an equation of the type:

$$\hat{N}_W = N_2 - N_1 + d + \Delta\mu \qquad (2)$$

where d designates a geometric correction linked to the difference between $D_1$ and $D_2$ which remains small before a cycle for the conventional antennae and can be calculated with a high precision if needed with the help of broadcast astronomical tables. W is no longer part of this equation. $\Delta\mu$ is a linear combination of the receiver-transmitter differences $\Delta\tau_{12}$, $\Delta\tau_1$, $\Delta\tau_2$ and is therefore also a difference between a value that depends only on the receiver (designated $\mu_{urec}$) and a value that depends only on the transmitter (designated $\mu_{eme}$). Given:

$$\Delta\mu(t) = \mu_{rec}(t) - \mu_{eme}(t) \qquad (3)$$

where the time dependence is explicitly indicated.

The value $\Delta\mu$ is common to all the measurements carried out at a same date on the different channels of the receiver.

The value $N_W = N_2 - N_1$ can be identified by solving equation (2) for a certain period, during which at least two simultaneous satellite passages occur (step 14). By setting $K_k$ as the integer to be found, equation (2) can be reformulated as follows:

$$R_k(t) + \mu_{eme,k}(t) = K_k + \mu_{rec}(t) \quad (4)$$

wherein $R_k(t)$ represents the residual associated with each measurement of the passage k, taking into account that according to (2), we have $R_k(t) = \hat{N}_W(t) - d(t)$, $\mu_{eme,k}(t)$ designates the widelane bias of the satellite of the passage k that must be provided to the receiver in order to determine the position (step 13), and $\mu_{rec}(t)$ designates the widelane bias of the receiver (unknown, therefore to be determined during the search for $K_k$).

It can be observed that equation (4) in point of fact represents a system of equations that can be solved, for example, by the least squares technique. This method is not further elaborated here. It is important to note that the solution for system (4) is not unique, rather there is a family of solutions that can be inferred from one another by the integer transformation $[\mu_{rec}(t), K_k] \leftrightarrow [\mu_{rec}(t) + n, K_k - n]$, for all integers n.

Another simple resolution for system (4), and which lends itself well to the illustration of the concept, is the construction of simple differences between measurements that are associated with different passages, thereby allowing the contribution of $\mu_{rec}(t)$ to be directly eliminated and equations of the following type to be obtained:

$$(R_b(t) + \mu_{eme,b}(t)) - (R_a(t) + \mu_{eme,a}(t)) = K_b(t) - K_a(t)$$

for the passages a and b. Calculation of the mean for the interval of time common to the passages a and b yields $K_b - K_a$. By proceeding iteratively, choosing other couples of passages that overlap well in time, one obtains other values $K_b - K_a$. This method works well when there is a good overlap in the time of the passages under consideration. In this way one finally determines the widelane ambiguities associated with the satellite passages in a coherent manner for the group of the satellites, to one common integer. In fact, for all the passages, one widelane ambiguity remains unknown, but all the other widelane ambiguities follow directly or indirectly once it is fixed—hence the denomination coherent determination for the group of satellites. Note that in the presence of consequential noise for the measurements, it is preferable to solve the system (4) directly (without differentiating between passages), for example with the help of the least squares technique, because the noise is greater (of the order of 1.4 times more) than for the equations of simple differences.

The values $\mu_{eme}$ should be explained, because without knowing these values, the receiver would not be able to access the coherent solution of the widelane ambiguities. The values $\mu_{eme}$ are preferably determined at the level of a network of reference receivers. Use is made of the property that in practice the $\mu_{eme}$ are functions that vary slowly over time. The method for determining the $\mu_{eme}$ at the level of a reference network was the subject of a patent application filed under the number FR 0754139. This method also uses the equations of the system (4). Preferably, the methodology for determining the $\mu_{eme}$ begins with the choice of a first reference station of the network, whose values of $\mu_{rec}$ (named in the following as $\mu_{rec,ref}$) are stable over time. For this station, $\mu_{rec,ref}$ are arbitrarily fixed, e.g. by setting $\mu_{rec,ref} = 0$. Then the passages of the satellites that are visible from this station are scanned. For each passage, one has $R_k = K_k - \mu_{eme}$, by definition from the first station. $R_k$ is then broken down into an arbitrary integer quantity (e.g. the nearest integer), giving $K_k$, and a quantity that is not necessarily integral corresponding to the difference $R_k - K_k$, which gives $\mu_{eme}$. This yields the $\mu_{eme}$ of the satellites that are visible from the first station.

For the set of satellites, for which the internal delays $\mu_{eme}$ are now known, the delays $\mu_{rec,ref}$ of the other stations are estimated. This time, in the equation $R_k(t) = K_k + \mu_{rec,ref}(t) - \mu_{eme,k}(t)$ the value of $\mu_{eme,k}$ is known. $R_k(t) + \mu_{eme,k}(t)$ is then broken down into an arbitrary integer (of the new station) and the delay of the corresponding station $\mu_{rec,ref}$. These steps are repeated for all the satellites of the constellation and all the stations of the reference network. The values $\mu_{eme}$ are finally obtained that are coherent for the entire reference network and can be considered to be constant for at least one day.

The $\mu_{eme}$ can be communicated by any convenient means to the receiver that has to determine its position, for example in the navigation message for the constellation of satellites under consideration, by terrestrial broadcast or from a SBAS satellite, by internet, by portable radiotelephone, etc. Given the low rate of change of the $\mu_{eme}$, little bandwidth is required to carry their values to the receiver that has to fix its position.

When the value of the widelane ambiguity is known, a new equation that is homogeneous to a pseudo distance can be constructed from the phase equations (1):

$$L_2 - L_1 + N_W = \left(\frac{D_2}{\lambda_2} - \frac{D_1}{\lambda_1}\right) - \left(\frac{\gamma}{\lambda_2} - \frac{1}{\lambda_1}\right)e + \left(\frac{1}{\lambda_2} - \frac{1}{\lambda_1}\right)(\Delta h + \Delta \tau_W) \quad (5)$$

where $\Delta \tau_W$ is a value similar to a TGD (from "time group delay"), because it is a linear combination of $\Delta \tau_{12}, \Delta \tau_1, \Delta \tau_2$. This new combination has a very interesting noise measurement representing a little less than twice the noise of the phase (therefore typically 5 mm), compared with the noise of the code (typically some tens of centimeters).

Having the following non-ambiguous measurements (after fixing the widelane combination in classical RINEX notation, set of measurements at a date):

$$L_2 - L_1 + N_w = \quad (6)$$
$$D\left(\frac{1}{\lambda_2} - \frac{1}{\lambda_1}\right) - e\left(\frac{\gamma}{\lambda_2} - \frac{1}{\lambda_1}\right) + (k + \Delta h + \Delta \tau_w)\left(\frac{1}{\lambda_2} - \frac{1}{\lambda_1}\right)$$
$$P_1 = D + e + (\Delta h + \Delta \tau)$$
$$P_2 = D + \gamma e + (\Delta h + \gamma \Delta \tau)$$

where D and e are respectively the modelisable pseudo distance (including the tropospheric delay), and the ionospheric delay on the first frequency. $\Delta h$ is here the difference between receiver clock and transmitter clock, referenced to the combination of "ionosphere-free" pseudo distances (without ionospheric contribution) $(\gamma P_1 - P_2)/(\gamma - 1)$; $\Delta \tau$ correspond here to 'TGD' between receiver and transmitter, because the equations are referenced to the ionosphere-free combination, contrary to the equations (1). This does not change the generality, but references the equations (6) relative to that which is usually employed in the GPS system.

The equation of the widelane observable is particular because the set of the widelane ambiguities is determined to within one integer (called n).

The contributions from the corrections, such as the deviation from the phase centres, have been neglected, bearing in mind that the objective here is to analyse the noise of ideal combinations. In any respect, one can always assume that these corrections have been implemented prior to generating the above equations, as these corrections can be calculated at the level of the receiver with sufficient precision. The windup effect (which required knowledge of or modelling of the attitude of the satellites) has not been taken into account, as it is eliminated in the widelane combination (see equation 5)).

In the case of three observables, there are therefore three coefficients for constructing a combination of the equations (6) eliminating the ionospheric term (step 16). Setting $P_{opt}$ as the optimal combination of the observables of equations (6) and $a_w$, $a_1$ and $a_2$ the coefficients of this combination gives:

$$P_{opt} = a_W(L_2 - L_1 + N_W) + a_1 P_1 + a_2 P_2. \tag{7}$$

When the coefficient of D is 1 and that of e disappears, then the constraints are:

$$\left(\frac{1}{\lambda_2} - \frac{1}{\lambda_1}\right) a_W + a_1 + a_2 = 1 \tag{8}$$

$$-\left(\frac{\gamma}{\lambda_2} - \frac{1}{\lambda_1}\right) a_W + a_1 + \gamma a_2 = 0$$

There are two equations of constraint; there therefore remain an infinite number of possible combinations, among which combinations can be chosen by means of an additional criterion, such as noise minimisation or robustness of the results.

All the clock terms as well as the terms $\Delta\tau$ and $\Delta\tau_w$ of the equations (6) are merged into a term that may be called, "clock associated with the combination" in the context of the utilisation of a given combination of these observables. This clock term is named $\Delta h_{opt}$ and thus $P_{opt} = D + \Delta h_{opt}$. We note that the receiver clock part of the term $\Delta h_{opt}$ is ambiguous (due to the unknown integer n), but this does not limit the resolution of a positioning problem, because in this case, the receiving clock is assumed to be unknown and is solved at each date. In order to deduct the pseudo-distance D from the combination $P_{opt}$ (step 16), the receiver needs to know the transmitter clock part of the term $\Delta h_{opt}$, which will be called $h_{opt,eme}$. The values for the $h_{opt,eme}$ are preferably calculated at the level of a reference system and transmitted to the receiver (step 15). The geographic position of the receiver is finally determined (step 18) thanks to the set of calculated pseudo-distances. It should be noted that the combination that is utilised in the receiver must be fixed beforehand (for example by convention or by defining a protocol) so that the values $h_{opt,eme}$ will be consistent with the combination. The $h_{opt,eme}$ can be determined in a classic manner at the level of the reference network thanks to the system of equations (6). It should be noted that at the level of the reference network, as the positions of the reference receivers (therefore also the pseudo-distances) are known, the system (6) is then solved for the unknowns $h_{opt,eme}$, $h_{opt,rec}$ etc.

The theoretical formulation of the problem of the construction of the linear combinations of a plurality of observables eliminating the ionospheric effect is described in detail above. It can be directly generalised to any number of observables.

Setting x as the vector of the coefficients of the combination of the three observables (widelane, code 1 and code 2), A and B the matrices of the coefficients of the equations (6), so as to have:

$$B = \begin{bmatrix} L_1 \\ L_2 \\ P_1 \\ P_2 \end{bmatrix} = A \begin{bmatrix} D \\ e \end{bmatrix}, \tag{9}$$

and $$x^t A = [1 \quad 0] \tag{10}$$

D is obtained by:

$$D = x^t B \begin{bmatrix} L_1 \\ L_2 \\ P_1 \\ P_2 \end{bmatrix} \tag{11}$$

Naming P the matrix of correlation of the noise of the four raw measurements of code and phase, the noise that corresponds to this solution is given by $\sqrt{x^t B P B^t x}$.

For each definition of the noise P, one can therefore find the coefficients of the optimal complex x and the noise on the associated solution (i.e. on the value of D). In the following, the order of magnitude of the optimum noise is illustrated for different cases of measurement noise.

EXAMPLE 1

Case of GPS (Bi-Frequency)

The following table shows the order of magnitude of the optimum noise in the case of GPS in bi-frequency mode (units in meters, frequencies 1 and 2 respectively 1575.42 MHz and 1227.60 MHz):

| Noise phase 1, 2 (m) | Noise code 1, 2 (m) | Resulting noise (m) |
| --- | --- | --- |
| Inf; Inf | 1.0; 1.0 | 2.97 |
| 0.01; 0.01 | 1.0; 1.0 | 2.78 |
| 0.01; 0.01 | 1.0; 0.1 | 0.36 |
| 0.01; 0.01 | 0.1; 1.0 | 0.45 |
| 0.01; 0.01 | 0.1; 0.1 | 0.28 |

The first line of this table (phase noise assumed to be infinite) corresponds to the classic case of the ionosphere-free combination of code. We note that the use of the combination of widelane phase is only of interest if at least one of the measurements of code has a low noise. However, the last three lines of the table are hypothetical cases, because the noise of the measurements of code of the GPS signals is of the order of one meter. It can also be seen that if one assumes that the two measurements of code have a noise of 10 cm, then this gives a noise of 30 cm on the ionosphere-free combination of code, thereby showing that bringing the widelane phase combination is insignificant if the two measurements of code are good (last line in the table). As an example, for a complete solution of the ambiguities, the resulting noise would be 3 cm, based on the chosen hypotheses.

EXAMPLE 2

Case of GPS (Tri-Frequency)

For the case GPS tri-frequency, we have the frequencies L1, L2 and L5. The systems of equations (6)-(11) can then be adapted and afford the following table of noise (units again in meters, frequencies 1, 2 and 3 1575.42 MHz, 1227.60 MHz and 1176.45 MHz, respectively):

| Noise phase 1, 2, 3 (m) | Noise code 1, 2, 3 (m) | Resulting noise (m) |
|---|---|---|
| Inf; Inf; Inf | 1.0; 1.0; 1.0 | 2.54 |
| 0.01; 0.01; 0.01 | Inf; Inf; Inf | 0.27 |
| 0.01; 0.01; 0.01 | 1.0; 1.0; 1.0 | 0.27 |
| 0.01; 0.01; 0.01 | 1.0; 1.0; 0.1 | 0.20 |
| 0.01; 0.01; 0.01 | 1.0; 0.1; 0.1 | 0.18 |
| 0.01; 0.01; 0.01 | 0.1; 0.1; 0.1 | 0.16 |

The behaviour is coherent with that of example 1: the two lower noise combinations contribute essentially to the performance. The first line of the table shows that the addition of the third frequency does not bring much to the resulting noise obtained by the ionosphere-free combination of code (which does not diminish the interest of three frequencies, for reasons of robustness, multi-paths, etc.).

On the other hand, a performance of 27 cm is directly obtained by solely using the measurements of phase in widelane combinations (second line of the table). A very good quality measurement of code would enable a little to be won in terms of resulting noise. Subsequently, a reduction in noise on the other measurements of code would only bring a marginal improvement to the resulting noise.

Compared with the standard case (ionosphere-free combination of code) there is therefore a factor 10 gain in noise by using the combinations of widelane phase, and a small additional gain by adding a higher performance measurement of code. The interest in the combinations of widelane phase stems from the fact that the data depend only on the phase and are consequently less subject to the problems of multi-paths than are the measurements of code.

EXAMPLE 3

Case of Galileo (Tri-Frequency)

The performance analysis was repeated for the case of the future Galileo system. The frequencies 1, 2 and 3 now used in the following table are therefore 1575.42 MHz, 1176.45 MHz and 1278.75 MHz, respectively.

| Noise phase 1, 2, 3 (m) | Noise code 1, 2, 3 (m) | Resulting noise (m) |
|---|---|---|
| Inf; Inf; Inf | 1.0; 1.0; 1.0 | 2.66 |
| 0.01; 0.01; 0.01 | Inf; Inf; Inf | 0.19 |
| 0.01; 0.01; 0.01 | 1.0; 1.0; 1.0 | 0.19 |
| 0.01; 0.01; 0.01 | 1.0; 1.0; 0.1 | 0.16 |
| 0.01; 0.01; 0.01 | 1.0; 0.1; 0.1 | 0.15 |
| 0.01; 0.01; 0.01 | 0.1; 0.1; 0.1 | 0.14 |

As was the case for tri-frequency GPS, the significant contribution is from the two combinations of widelane phase. The resulting noise in this case is improved here by more than a factor 10.

The preceding examples show that the use of the coherent widelane ambiguities in a tri-frequency receiver makes it possible to construct an ionosphere-free pseudo-distance whose noise is improved by a factor of 10 compared with the ionosphere-free pseudo-distance obtained solely by combinations of measurements of code.

The use of this capability resides in the availability of different data at the level of the receiver, viz. the widelane biases of the satellites (the values of the $\mu_{eme}(t)$) as well as the satellite clock data associated with the optimal combination used at the level of the receiver. The widelane biases $\mu_{eme}$ are calculated for the widelane combination or combinations used and for all the satellites of the constellation at the level of a reference system. Moreover, the reference system determines the clocks $h_{opt,eme}$ for the chosen optimal combination and the ephemerides, which the receiver has available in order to fix its position. The data needed by the receiver are preferably regularly communicated from the reference system according to a pre-defined protocol. In principle, all channels of communication can be used, with the condition that their bandwidth is suitable. The receiver preferably possesses a memory for storing the data communicated by the reference system between the various updates.

Theoretically, new ephemerides are not required in order to employ the method according to the invention, i.e. the standard ephemerides broadcast by the satellites in the navigation message could be used. However, it should be noted that firstly, their performance is going to limit the interest of the method, secondly, that the clocks associated with the optimal combination should then be calculated from these ephemerides. In order that the user can benefit completely from the performance of the method (typically to have a precision better than 10 centimeters on the measurement), it is preferable to provide more precise updates for the ephemerides.

Moreover, the general case requires a broadcast of the clocks corresponding to the employed combination. Nevertheless, these clocks could also be obtained by a correction with regard to the reference clocks (in a similar manner to the inter-frequency bias ("TGD") of GPS, which enables clocks that are adapted to the first frequency to be obtained from the reference clocks resulting from the ionosphere-free combination. In most cases these corrections will be constant or slowly variable. The method is therefore compatible with more precise clocks, obtained for example by the complete blocking of the integer ambiguities at the system level.

The invention claimed is:
1. Method of treating radionavigation signals that originate from a group of satellites, in which each satellite broadcasts at least a first radionavigation signal on a first frequency and a second radionavigation signal on a second frequency that is different from the first, said method comprising, at a receiver:
   receiving, for each satellite of said group, said first and second signals;
   executing, for each satellite of said group, non-differentiated measurements of code and phase of said first and second received signals, said measurement of phase of the first signal and said measurement of phase of the second signal each having an a priori unknown integer ambiguity, such that a widelane combination of the measurements of phase of the first and second signals has an a priori unknown widelane integer ambiguity;
   receiving, from a reference system, a widelane bias associated with each satellite in said group of satellites;
   determining, for each satellite of said group of satellites, an estimated widelane ambiguity based on the corresponding non-differentiated measurements of code and phase;
   determining, for each satellite of said group of satellites, the respective widelane ambiguity based on the corresponding estimated widelane ambiguity and the corresponding widelane bias; and fixing a position of the receiver using said measurements of code and phase of the first and second received signals as well as the widelane ambiguities determined for the group of satellites,
said fixing the position of the receiver comprising, for each satellite of said group of satellites, determining a pseudo distance using an ionosphere-free combination of said measurements of code and a difference of the measurements of phase of the first and second signals, compensated by the widelane ambiguity, said determining of the pseudo distance also depending on satellite clock values associated with said ionosphere-free combination, said satellite clock values being received from a second reference system.

2. Method according to claim 1, wherein said determining of the widelane ambiguities for the group of satellites comprises:
receiving widelane biases associated with the satellites of said group of satellites from the reference system;
for each satellite of the group of satellites, calculation of an estimated value for the widelane ambiguity according to equation:

$$\hat{N}_W = \left(\frac{P_2 - 2\gamma\hat{e}}{\lambda_2} - L_2\right) - \left(\frac{P_1 - 2\hat{e}}{\lambda_1} - L_1\right)$$

where $\hat{N}_W$ designates said estimated value of the widelane ambiguity,
$P_1$ and $P_2$ designate the measurements of code of the first and second signals, respectively,
$L_1$ and $L_2$ designate the measurements of phase of the first and second signals, respectively,
$\lambda_1$ and $\lambda_2$ designate wavelengths of the first and second signals, respectively, $$\gamma = \frac{\lambda_2^2}{\lambda_1^2},$$

and $\hat{e}$ designates an estimate of an ionospheric delay to be taken into consideration for the first signal;
for each satellite of said group of satellites, establishment of a model for the widelane ambiguity in accordance with $$N_W = \hat{N}_W - d + \mu_{sat} - \mu_{rec}$$

where $N_W$ designates the widelane ambiguity,
d designates a geometric correction term,
$\mu_{sat}$ designates a widelane bias associated with a respective satellite,
$\mu_{rec}$ designates a widelane bias associated with the receiver, common to all the widelane ambiguities;
and identifying a set of integer values of the widelane ambiguities that conform to said model for the group of satellites.

3. Method according to claim 2, wherein the identification of said integer values is accomplished using simple differences between satellites from said models for the widelane ambiguities.

4. Method according to claim 1, wherein said first and second frequencies are selected among frequencies L1, L2, L5 and E6.

5. Method according to claim 1, wherein each satellite of said group broadcasts a third radionavigation signal on a third frequency distinct from the first and second frequencies, wherein,
for each satellite of said group, said third signal is also received;
non-differentiated measurements of code and phase of said third received signals are executed for each satellite of said group, said measurement of phase of the third signal having an a priori unknown integer ambiguity, such that a widelane combination of the measurements of phase of the first and third signals has a further a priori unknown widelane integer ambiguity;
the further widelane ambiguities are determined for the group of satellites, and
said fixing the position of the receiver is made using said measurements of code and phase of the third signals as well as the further widelane ambiguities determined for the group of satellites.

6. Method according to claim 5, wherein said determining of said further widelane ambiguities for the group of satellites is effected in an analogous manner to determining of the widelane ambiguities for the group of satellites.

7. Method according to claim 5, wherein said third frequency is selected among frequencies L1, L2, L5 and E6.

8. Method according to claim 1, wherein among said non-differentiated measurements of code at least one has a noise less than 0.5 m.

9. Method according to claim 5, wherein each of said non-differentiated measurements of code has a noise greater than 0.5 m.

10. Method according to claim 1, wherein the reference system and the second reference system are a same system.

11. Method according to claim 1, wherein the reference system and the second reference system are different systems.

12. Method of treating radionavigation signals that originate from a group of satellites, in which each satellite broadcasts at least a first radionavigation signal on a first frequency, a second radionavigation signal on a second frequency and a third radionavigation signal on a third frequency, said first, second and third frequencies being mutually distinct, said method comprising, at a receiver:
receiving, for each satellite of said group, said first, second and third signals;
executing, for each satellite of said group, non-differentiated measurements of code and phase of said first, second and third received signals, said measurement of phase of the first signal, said measurement of phase of the second signal and said measurement of phase of said third signal each having an a priori unknown integer ambiguity, such that a first widelane combination of the measurements of phase of the first and second signals has an a priori unknown first widelane integer ambiguity and a second widelane combination of the measurements of phase of the first and third signals has an a priori unknown second widelane integer ambiguity;
receiving, from a reference system, a widelane bias associated with each satellite in said group of satellites;
determining, for each satellite of said group of satellites, an estimated widelane ambiguity based on the corresponding non-differentiated measurements of code and phase;
determining the first widelane ambiguity and the second widelane ambiguity for the group of satellites by using the respective widelane bias, received from the reference system, and the respective estimated widelane ambiguity, and
fixing a position of the receiver using said measurements of code and phase of the first, second and third received signals as well as the first and second widelane ambiguities determined for the group of satellites, said fixing the position of the receiver comprises, for each satellite of said group of satellites, determining a first pseudo distance using a first ionosphere-free combination of said measurements of code and a difference of the measurements of phase of the first and second signals, compensated by the first widelane ambiguity, and determining a second pseudo distance using a second ionosphere-free combination of said measurements of code and a difference of the measurements of phase of the first and third signals, compensated by the second widelane ambiguity, said determining of the first and second pseudo distances also depending on satellite clock values associated with said first and second ionosphere-free combinations, said satellite clock values being received from a second reference system.

13. Method according to claim 12, wherein the reference system and the second reference system are a same system.

14. Method according to claim 12, wherein the reference system and the second reference system are different systems.

15. A method implemented by a Global Navigation Satellite System (GNSS) receiver, configured to treat radionavigation signals that originate from a group of satellites, in which each satellite broadcasts at least a first radionavigation signal on a first frequency and a second radionavigation signal on a second frequency that is different from the first, said method comprising:

receiving, for each satellite of said group, said first and second signals;

executing, for each satellite of said group, non-differentiated measurements of code and phase of said first and second received signals, said measurement of phase of the first signal and said measurement of phase of the second signal each having an a priori unknown integer ambiguity, such that a widelane combination of the measurements of phase of the first and second signals has an a priori unknown widelane integer ambiguity;

receiving, from a reference system, a widelane bias associated with each satellite in said group of satellites;

determining, for each satellite of said group of satellites, an estimated widelane ambiguity based on the corresponding non-differentiated measurements of code and phase;

determining, for each satellite of said group of satellites, the respective widelane ambiguity based on the corresponding estimated widelane ambiguity and the corresponding widelane bias, and fixing a position of the receiver using said measurements of code and phase of the first and second received signals as well as the widelane ambiguities determined for the group of satellites, wherein said fixing the position of the receiver comprises, for each satellite of said group of satellites, determining a pseudo distance using an ionosphere-free combination of said measurements of code and a difference of the measurements of phase of the first and second signals, compensated by the widelane ambiguity, said determining of the pseudo distance also depending on satellite clock values associated with said ionosphere-free combination, said satellite clock values being received from a second reference system.

16. Method according to claim 15, comprising a program stored in a memory, set up in such a way to cause the receiver to treat the signals when the program is executed in the receiver.

17. Method according to claim 15, wherein the reference system and the second reference system are a same system.

18. Method according to claim 15, wherein the reference system and the second reference system are different systems.

* * * * *